United States Patent

Mitchell

[11] Patent Number: 5,811,038
[45] Date of Patent: Sep. 22, 1998

[54] METHOD OF BLENDING COMPONENTS FOR POROUS PLASTIC PIPE PROCESSING

[75] Inventor: William S. Mitchell, McKenzie, Tenn.

[73] Assignee: Plastic Specialties and Technologies Investments, Inc., Ridgefield, N.J.

[21] Appl. No.: 722,506

[22] Filed: Sep. 27, 1996

[51] Int. Cl.⁶ .................................................. B29C 47/92
[52] U.S. Cl. .................... 264/40.7; 264/41; 264/209.6; 264/349; 264/560; 264/562
[58] Field of Search .................. 264/41, 45.9, 45.3, 264/209.6, 209.7, 40.6, 40.7, 40.3, 560, 562, 349; 425/205

[56] References Cited

U.S. PATENT DOCUMENTS

| | | | |
|---|---|---|---|
| 2,423,260 | 7/1947 | Slaughter | 18/14 |
| 2,708,772 | 5/1955 | Moncrieff | 18/14 |
| 3,624,025 | 11/1971 | Twist | 264/40.4 |
| 3,788,923 | 1/1974 | Soliman | 264/349 X |
| 3,880,965 | 4/1975 | Dudis et al. | 261/122 |
| 4,003,408 | 1/1977 | Turner | 138/118 |
| 4,012,348 | 3/1977 | Chelland et al. | 264/40.7 X |
| 4,078,113 | 3/1978 | Starbuck et al. | 156/244.24 X |
| 4,110,420 | 8/1978 | Turner | 264/41 |
| 4,168,799 | 9/1979 | Turner | 239/145 |
| 4,244,897 | 1/1981 | Moon | 264/40.4 X |
| 4,422,991 | 12/1983 | Phillips | 264/83 |
| 4,498,783 | 2/1985 | Rudolph | 366/132 |
| 4,501,498 | 2/1985 | McKelvey | 366/69 |
| 4,517,316 | 5/1985 | Mason | 521/81 |
| 4,544,279 | 10/1985 | Rudolph | 366/132 |
| 4,551,289 | 11/1985 | Schwab et al. | 264/40.4 X |
| 4,581,137 | 4/1986 | Edwards | 210/220 |
| 4,615,642 | 10/1986 | Mason | 405/45 |
| 4,616,055 | 10/1986 | Mason | 524/381 |
| 4,622,139 | 11/1986 | Brown | 210/170 |
| 4,684,488 | 8/1987 | Rudolph | 264/40.4 X |
| 4,776,127 | 10/1988 | Jackson | 43/57 |
| 4,923,659 | 5/1990 | Kunz | 264/85 |
| 4,931,236 | 6/1990 | Hettinga | 264/48 X |
| 4,938,605 | 7/1990 | Freidrich | 366/76 |
| 4,958,770 | 9/1990 | Mitchell | 239/145 |
| 5,034,164 | 7/1991 | Semmens | 261/122 |
| 5,063,018 | 11/1991 | Fontirroche | 264/514 |
| 5,075,048 | 12/1991 | Veeder | 261/122 |
| 5,114,648 | 5/1992 | Kuc, Sr. | 264/134 |
| 5,262,096 | 11/1993 | Egashira | 261/122.1 |
| 5,330,688 | 7/1994 | Downs | 261/122.2 |
| 5,334,336 | 8/1994 | Franz et al. | 264/45.9 X |
| 5,352,610 | 10/1994 | Braeutigam | 435/284 |
| 5,376,311 | 12/1994 | DeGuzman | 261/77 |
| 5,391,334 | 2/1995 | Enomoto | 264/40.7 |
| 5,417,997 | 5/1995 | Creed | 264/178 R X |
| 5,422,043 | 6/1995 | Burris | 261/122.1 |
| 5,445,775 | 8/1995 | Prassas et al. | 264/41 |
| 5,453,229 | 9/1995 | Enomoto | 264/40.7 |
| 5,462,092 | 10/1995 | Franz et al. | 138/177 |

FOREIGN PATENT DOCUMENTS

Wo 90/12680  11/1990  WIPO ........................ 264/45.9

*Primary Examiner*—Leo B. Tentoni
*Attorney, Agent, or Firm*—Wood, Herron & Evans, L.L.P.

[57] ABSTRACT

This invention relates to the manufacture of flexible porous plastic irrigation and aeration pipe having an essentially uniform porosity throughout its length. The process for making the porous pipe includes volumetrically delivering to a mixing hopper for preblending thermoset polymer particles and a thermoplastic binder for the particles, preblending the components in the hopper, volumetrically feeding from the hopper the preblended components for controlled discharge into an extruder, and extruding the preblended components to produce the porous plastic pipe.

12 Claims, 2 Drawing Sheets

METHOD OF BLENDING COMPONENTS FOR POROUS PLASTIC PIPE PROCESSING

RELATED APPLICATIONS

This application is related to applications Ser. Nos. 08/722,505 and 08/720,078, filed contemporaneously with the instant application on Sep. 27, 1996, and entitled, "Gas Injection Process for Producing Porous Plastic Pipe" and, "Aeration Pipe and Method of Making Same", which are incorporated herein in their entireties by reference.

1. Field of the Invention

This invention relates to the production of flexible porous plastic irrigation and aeration pipe, and an improved method for blending components during manufacture.

2. Background of the Invention

In recent years, considerable effort has been expended on delivering and conserving water as it has become an increasingly valuable and expensive resource. It has become necessary to develop more efficient systems for delivering water to sustain plant life. Most above ground irrigation systems have utilized sprinkler devices for surface watering which is extremely wasteful in that the water flows off the surface and is not uniformly absorbed, or rapidly evaporates, only limited portions reaching the plant roots. The roots are the water utilization system for most plants and must be present for their enzyme-water dependent processes to sustain plant life. In addition, above ground watering practices interfere with the use of recreational areas such as playing fields and golf courses. Most importantly, surface water cannot be specifically directed to the desired plants or crops being applicable to both desired and undesired plant life such as weeds.

Subsurface irrigation systems have been developed in which water, both with and without nourishing fertilizer, is directly delivered to the subsurface depth of the crop roots being cultivated. Such systems have employed flexible pipe which is inert to the soil conditions and is capable of withstanding hydrostatic pressure without collapsing. The pipe may be readily bent to follow crop-line contours and elevations. The pipe which emits water slowly over its entire surface and length is buried to the proper depth underground for the particular crop or plant life being irrigated so that water is supplied directly to the plant roots. The amount of water delivered can be precisely controlled at or near optimum levels for the particular crop or plant life. In many cases, crop yields have been substantially increased. Irrigation using porous pipe requires that the water be delivered uniformly along its length. The soil soaking process is generally similar to that obtained by drip irrigation; however, the leak rate is continuous along the pipe length rather than at discrete individual points or outlets as in drip irrigation.

Porous irrigation pipe produced from reclaimed rubber mixed with polyethylene as a binder has been disclosed by Turner in U.S. Pat. Nos. 4,003,408; 4,110,420; and 4,168,799. The prescribed mixture is extruded to form the pipe, and it is claimed that the water present within the hot extrudate vaporizes, producing the small pores through which water is emitted under low pressure. Such pipe presents problems in use due to its highly variable and uncontrolled porosity. Some sections have exhibited few or no pores while other sections have large uneven pores. Water delivery rates from this pipe have varied from 50 to 75 percent along relatively short lengths indicating the product is unsuitable for close plantings. Thus, the overall porosity of the pipe is not sufficiently controlled for uniform water delivery resulting in problems when designing a subsurface water irrigation system for a prescribed location. It appears, although it is certainly not conclusive, that the wide variation in porosity of this pipe product is primarily due to failure to control the moisture content of the extruded mixture. In the manufacture of this product, attempts were made to control excess water in the mixture by venting the extruder, but this procedure did not result in controlling the variable porosity of the pipe. In addition, the vented extruder produces a pipe product having a rough internal surface which results in a high pressure drop along a length of pipe due to a high coefficient of friction and high Reynolds numbers for fluid flow. Such condition increases uneven water emission along a given length of porous pipe.

Other attempts to improve porous irrigation pipe have been made by Mason in U.S. Pat. Nos. 4,517,316; 4,615,642; and 4,616,055. In his processes, the raw materials are pre-processed into shaped pellet form to provide a pre-formed feed material to the extruder which is less hygroscopic than powdered feed materials. However, his process is more costly and involved requiring the pelletizing steps. In addition, his moisture content of the pellets is much higher than that of the present invention ranging from 0.5 to 3.0 percent by weight of water. Such water content does not improve the uniformity of porosity of the pipe but exacerbates the problems of non-uniform porosity and uneven water emission. Mason in U.S. Pat. No. 4,517,316 utilizes additional constituents such as slip agents and lubricants, and excessive amounts of water in his pelletized mixture, and extrudes the pellets from the pipe extruder at an excessively high temperature. His porous pipe shows no improvement in porosity variation over that of the prior art primarily due to excessive moisture in his pellets. Mason U.S. Pat. No. 4,615,642 attempts to improve leak rate variation by varying the extruder die temperature and by varying the pull-off rate of the pipe. He seeks to controllably increase the porosity from first inlet end to second outlet end of the pipe length so that the leak rate is constant throughout the pipe length as the pressure drops between the ends. However, such constant varying of process variables does not produce an improved porous pipe. Mason in U.S. Pat. No. 4,616,055 also pelletizes the raw materials and employs additives to increase the flow of binder resin around the rubber particles; however, it does not result in more uniform porosity of the pipe. He coats the surface particles on the inner wall of the pipe to no avail in attempting to solve the porosity problems. In addition, all of Mason's porous pipe processes length limitations in actual use despite his variable process procedures. His control of the water content of the raw materials in pellet form is inadequate for the intended purpose.

In U.S. Pat. No. 4,958,770, further improvements are disclosed for making porous flexible irrigation pipe having uniform porosity. However, problems still exist, including irregularly shaped pipe walls, inconsistent porosity, and unsatisfactory micropore size and wall thickness thereby producing variable fluid leak rates. Therefore, improvements in the manufacture of porous pipe are still needed. In particular, there exists a need for a porous pipe and a process for making such pipe that controls hose composition, including component particle size, blending of the composition components, extrusion rates and pulling rates to provide consistent leak rates for pipes, especially in the agricultural or commercial uses where pipe products are buried under ground and last a longer period of time than a retail soaker hose. Also, additional improvements in an extrusion process for making porous pipe are needed to limit mechanical wear on the extruder while maintaining an efficient extrusion rate and a more uniform and consistent porosity along the entire length of a pipe without affecting pipe shape.

SUMMARY OF THE INVENTION

The present invention relates to a method of making porous plastic irrigation and aeration pipe having a porosity which is substantially uniform. Generally, the present invention is directed to a blending process for improving extrusion efficiency and quality of porous plastic pipe. In particular, the blending process comprises vacuum loading rubber particles and polyethylene binder for the particles into separate feeding chambers and volumetrically delivering by volumetric metering augers with variable speed drives each of the rubber particles and polyethylene binder components from the chambers to a mixing hopper for preblending prior to extrusion. The preblended rubber particles and polyethylene binder components are volumetrically fed by a volumetric metering takeaway auger with a variable speed drive for controlled discharge into an extruder. Thereafter, the preblended components are extruded to produce a porous pipe having a substantially uniform porosity along the length of the pipe. The blending process preferably incorporates an agitator in at least one of the chambers for adequately mixing the components in such chamber prior to extrusion. Further, volumetric metering takeaway augers with variable speed drives are used for controlled discharge of said components to provide a substantially uniform porosity along the length of said pipe. The preferred thermoplastic binder resin to bind the thermoset rubber particles is linear low density polyethylene.

Additionally, the process of the present invention utilizes components which have an extremely low moisture content and are extruded from an unvented single screw extruder. The extruder temperature, especially at the extruder die, the blending process for the composition components, and the pull-off or stretching rate are all precisely controlled to produce a porous pipe having uniform porosity and a uniform leak rate throughout lengthy runs of the pipe over a broad range of fluid pressures. The pipe issuing from the extruder is slowly cooled in a lengthy water bath, the uniform porosity being obtained by the non-homogeneity of the composition mixture, the composition being essentially moisture-free and the amount of positive gas pressure being injected through the heated die into the softened pipe-preform as it exits the mandrel. Since it is known that rather small changes in the pull-off or stretching rate produce large changes in the porosity, micropore dimension and leak rate of the pipe, the extrusion of the pipe and the pull-off and stretch through the liquid bath are maintained constant for optimum results. The temperature control of the extrusion die and the speed of the extrusion and puller are controlled by electronic controllers to provide the precise and stable conditions required.

The use of the non-vented extruder is preferred since the water content of the extrudate is maintained extremely low and no need exists to vent excess vapor pressure. With the moisture content of the extrudable mixture being controlled to less than about 0.15% by weight water, porosity in the pipe can be controlled and is not dependent on water vapor producing small apertures or pores in the pipe walls. In view of the other elements of the process being precisely controlled, vapor pressure does not influence pore formation, but the non-homogeneity of the intimate mixture based on two major constituents is a most significant factor. Porosity of a given run of pipe as manufactured in accordance with the present invention has shown a variation of fluid delivery of less than about 5%. Thus, the porous pipe can be efficiently made having highly uniform porosity through the desired range of size and strength limitations for its use in a wide range of irrigation and aeration applications. The uniformity of the pores permit very lengthy runs of pipe to be employed in a wide variety of application uses. Porous pipe has been produced having a much more uniform and regular pore structure primarily due to the improved blending and control of the materials in the dual-component system without the addition of slip agents or lubricants.

DETAILED DESCRIPTION OF THE INVENTION

The extrudable mixture of the present invention comprises a major portion of thermoset polymer particles and a minor portion of a low density polyolefin as a binder such as linear low density polyethylene. No further constituents are required; however, in some cases it may be desirable to include extremely small amounts of slip agents or lubricants depending upon process parameters. Examples of suitable thermoset polymer particles include cured or sulfur-crosslinked natural or synthetic rubber. Cured crumb rubber reclaimed from the tread portions of vehicular tires is a most readily available and inexpensive constituent. The tread portion is known to comprise the better quality rubber of such tires, much more so than the side walls or casings. The rubber is ground into crumb-like particles which have a mesh size of about 30 to about 120 mesh, preferably about 40 (0.0165 inch) to about 50 mesh for porous irrigation pipe and approximately 80 to 100 mesh for porous aeration pipe.

The binder component is a thermoplastic resin material such as linear low density polyethylene resin capable of thermal softening below about 300° F. while the extruder die operates at a temperature ranging from about 350° to 365° F. Such resin is inert to the other component of the pipe, i.e., the cured rubber, and forms a non-homogenous mixture therewith under the prevailing conditions of thermal extrusion. Other binders may be substituted for the polyethylene; however this material is preferred since it is unreactive in soil environment in long term use and to various chemicals and fertilizers which may be dispensed through the pipe along with fluid. Low density polyethylenes are known to have a density ranging from about 0.90 to 0.93 gram/cubic centimeter, and porous pipe made with such binder resin is very flexible and can be easily bent to desired configurations and contours. The polyethylene is usually employed in the form of granules or particles also having a fineness of about 40 mesh.

Both the crumb rubber and polyethylene binder are thoroughly dried prior to their introduction into the extruder. The total moisture content of each component and the mixture is maintained at a level below about 0.15% by weight water prior to their combined use. Such low water content is critical to the development of small uniform pores in the pipe during and after extrusion. The non-homogeneity of the mixture and the proportions of the two components serves to create uniform porosity in the pipe wall.

Figure 1:
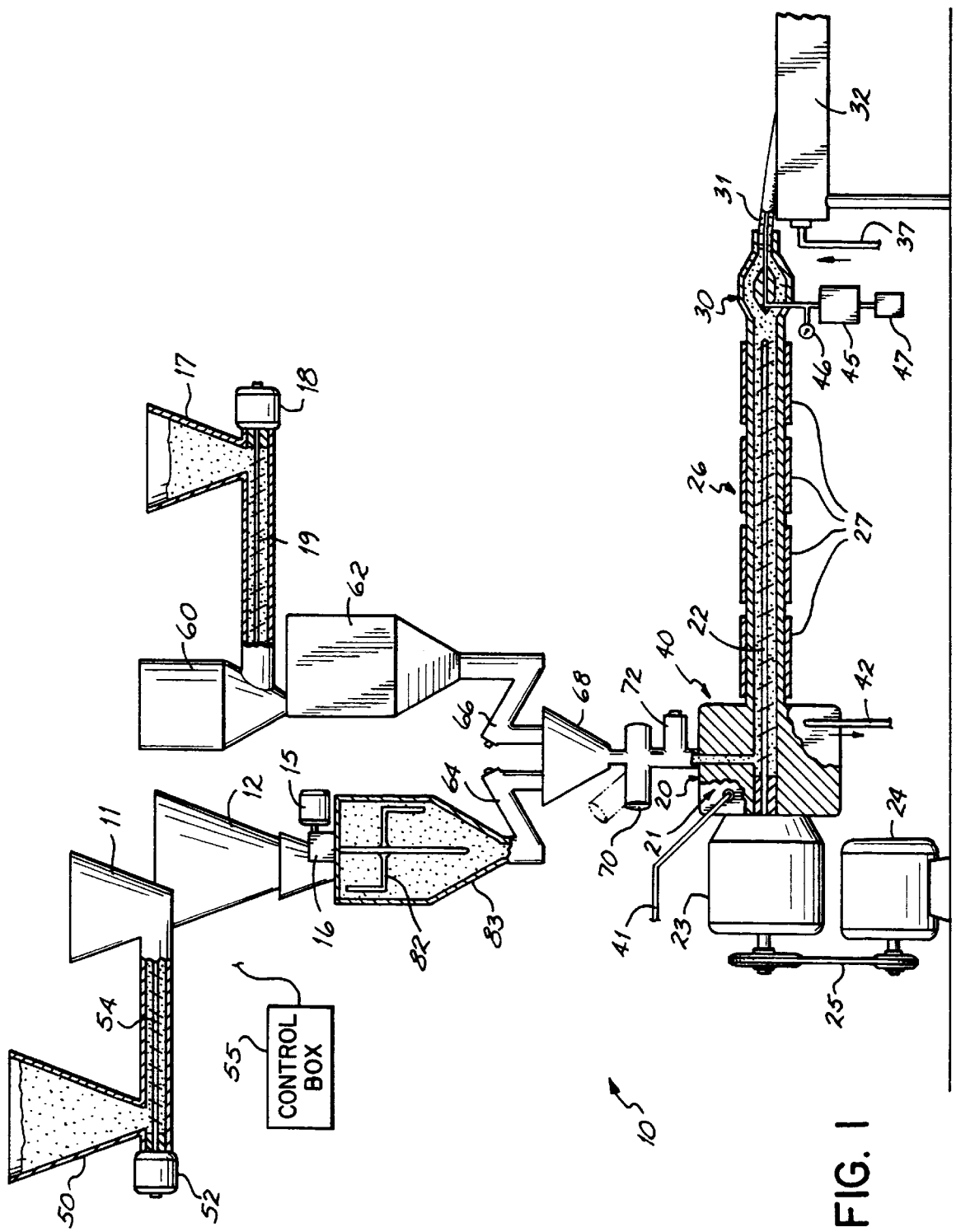
FIG. 1 is a schematic view of a system for extruding and cooling porous pipe in accordance with the invention.

The mixture consists of about 60% to 90% by weight crumb rubber particles and about 10% to 40% by weight polyethylene, preferably linear low density polyethylene, the preferred ratio being about 80% to 20% by weight for manufacturing aeration pipe, respectively, while other ratios are preferred depending on the porosity desired and needed and the intended use of the porous pipe. In accordance with the invention, the mixture is combined and intimately mixed prior to its introduction into the extruder or delivered to the extruder through separate component hoppers affixed thereto as shown in FIG. 1. The mixture is further mixed and heated within the extruder and passed therethrough by a single-screw having a continuous spiral flight. The mixture is melted together, the binder being thermally softened and the crumb rubber particles remaining as discrete individual unmelted irregularly-shaped crumb particles. The particles are coated by the binder during the mixing and agitation action of the extruder apparatus, the lack of moisture assisting in the coating action.

Referring to FIG. 1 in particular, electrical control box 55 controls all of the vacuum loading in accordance with the invention. For example, control box 55 controls the level sensors that informs the extruder system and apparatus when to call for material, whether the material is thermoplastic binder or crumb rubber particles. The rubber particles are vacuum loaded from a vertical blender 50. The vertical blender 50 may be used to further break up the crumb rubber and homogenize the particles where the rubber particles are from reclaimed product and are not exactly identical samples. Blender 50 permits a large amount of rubber, upwards of 1250 pounds, to be blended and mixed prior to introduction of the thermoplastic binder component. The extrusion apparatus 10 consists of a conventional flight extruder which is unvented due to the inherently dry condition of the extrudable materials. A preferred example is a conventional 3.5 inch, 24 to 1 ratio of length to diameter extruder, which is both non-vented and aircooled.

Preferably, a drier chamber 11 is provided to fully dry the crumb rubber particles prior to mixing. The crumb rubber may be received from blender 50 by conventional methods, i.e., an electric motor 52 and a drive screw 54. Vacuum loading hoppers 12 and 60 are mounted on the upper region of the extruder apparatus to initially receive the rubber crumb and polyethylene binder from blender 50 and binder feeder hopper or silo 17. Vacuum loader 12 loads the rubber crumb particles that have been mixed and substantially homogenized in blender 50 for smooth delivery of the crumb rubber. Feeder silo 17 is provided to contain the binder material, i.e., linear low density polyethylene resin, which can be mounted on an upper region of the extruder or may be located in a position for easy loading. An electric motor 18 may used to drive a feeder screw 19 to deliver the polyethylene binder from silo 17 to vacuum loader 60.

Below vacuum loaders 12 and 60 are separate chambers 83 and 62 which receive the rubber particles and polyethylene binder. Chamber 83 receives the rubber crumb particles and has an agitator 82 inside the chamber that is operated by a motor 15 and gear box 16 that is located on top of the chamber. The agitator keeps the rubber from settling out or bridging over. Rubber, in general, whatever the mesh or particle size, is fairly hard to move in a uniform manner. However, constant agitation allows the rubber particles to fall in a more uniform manner. Chamber 62 receives the thermoplastic polyethylene binder and because polyethylene flows rather easily, this hopper is adequate to handle the material.

Volumetric metering augers 64 and 66 lie underneath the chambers retaining the polyethylene and crumb rubber particles. Preferably, these metering augers are operated by DC drive motors and are small enough not to pose an obstruction to the overall apparatus. Additionally, augers 64 and 66 are variable speed augers that take polyethylene out of chamber 62 and rubber particles from underneath chamber 83 and deliver the product, i.e., the rubber and polyethylene blended together, into a mixing chamber 68 located underneath the augers. Again, control box 55 is controlling all of these functions automatically. It is keeping the proper amount of material in both chambers 83 and 62 by controlling the amount of product through metering augers 64 and 66. Further, these augers do not run at the same speed. They are proportional augers. If the process needs more material, control box 55 will speed the augers up or slow them down, whatever the need is proportionally, to achieve a consistent blend entering mixing chamber 68.

Underneath blending chamber 68 is a set-off blender 70. This blender helps to continue the blending operation and it blends the product even better so that a more consistent blend and, therefore, a more consistent leak rate in the irrigation or aeration pipe is achieved. It is very important to have a consistent leak rate, especially in agricultural or commercial uses where the products are buried permanently under ground and go for a lot longer length of time than would normally be seen in a retail soaker hose or a ceramic dome diffuser. Thus, it is very important that it leak evenly along the length of the pipe and its porosity is uniform providing for a quality and durable product.

Thereafter, the blended product drops into a rate auger 72. All of the augers, rate auger 72 and metering augers 64 and 66, are driven by DC drive motors. Thus, each of these contributes to the speed of the input of the blended materials into the extruder and may vary the speeds to achieve maximum efficiency. This also helps keep from overloading the extruder while maintaining a constant flow rate into extruder 21 to provide maximum production of the product out of the entire extruding apparatus.

The several dried and thoroughly blended materials are introduced into a feed throat 20 which is water-cooled and then into extruder 21. The extruder has a gear-driven mixing screw 22 which is driven by a gear box 23 having a reduction ratio of about 17.5 to 1.

Gear box 23 is driven by a relatively large electric motor 24 through a connecting drive belt 25. The extruder barrel 26 extends horizontally and is provided with a carbide-hardened liner as is well known in the art. The barrel is provided with about 4 or 5 electrically-heated, air-cooled elements 27 spaced along the barrel which control the zonal heating of the extrudate in the barrel. An annular pipe mandrel or die 30 having about two annular heating elements mounted around the die is used to precisely control the die temperature and the newly formed porous pipe 31 extruding therefrom.

The pipe-preform 31 is delivered into a lengthy cooling trough 32 located closely adjacent to the pipe die 30. The pipe is supported by spaced-apart rollers mounted within the trough. The trough is quite lengthy extending preferably about 70 to 80 feet in a straight line and containing cooling water having a temperature of preferably about 48° to 52° F. The pipe sets up into its final form within the trough. Puller drive wheels (not shown) are mounted in vertical array to contact upper and lower surfaces of the pipe to pull the same through the trough. The lower drive wheel of the puller is driven by a puller motor to exert tension in the pipe for its uniform delivery to a winder for wrapping the pipe onto a spool.

The electric motors which drive the extruder and puller respectively are preferably DC motors and are slaved together to obtain a very precise control over the pipe extrusion and pull-off rate at the same speed. Thus, the process is capable of producing a very uniform product having the desired porosity while maintaining an overall cost-effective efficiency.

To cool the pipe-preform, an inlet line 37 delivers chilled cooling water into the trough 32 and the warm water exits from the trough through an outlet line (not shown). A temperature controller connected to a flow meter is used to maintain a uniform water temperature in the cooling trough. Also, the so-called additive head 40 of the extruder is maintained at a constant temperature by cooling water introduced therein through inlet line 41 and outlet line 42. Thus, the extrudate is introduced into the extruder at a precisely controlled temperature.

The annular extruder mandrel or die 30 may be maintained at a temperature ranging from about 270° to 390° F., however, the preferred range of temperature is about 350° to 365° F. for rubber particles and linear low density polyethylene binder. The porous pipe may be formed in a variety of sizes depending on its intended use, however a preferred range of sizes ranges from about 0.375 to 1.0 inch internal diameter with a wall thickness of about 0.10 inch. The porous pipe exhibits an extremely uniform porosity of less than about 5% fluid delivery variation whether a liquid or a gas is emitted from the porous pipe. The uniformity of the pores permit very lengthy runs of pipe to be employed in a wide variety of application uses.

Figure 2:
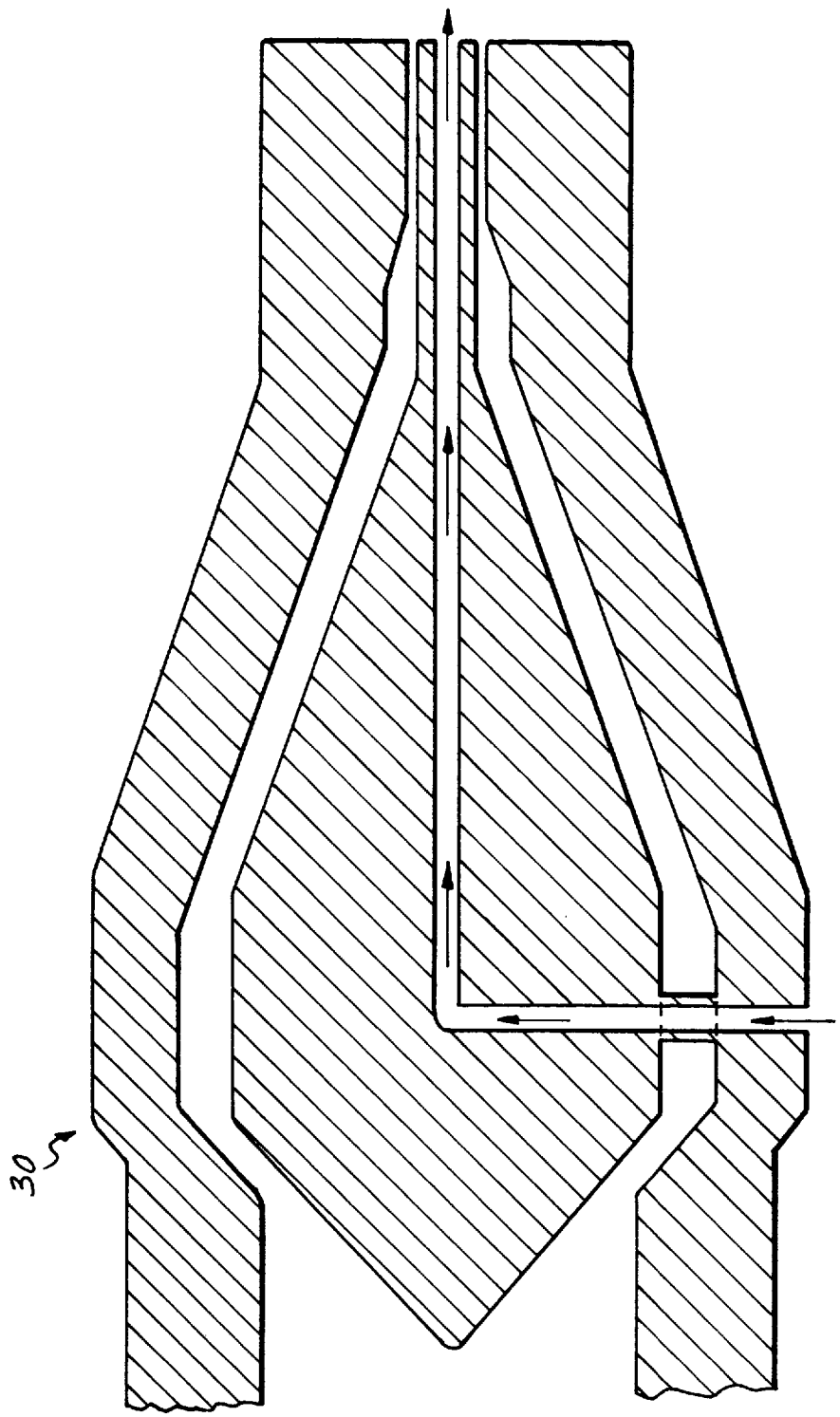
FIG. 2 is an enlarged cross-sectional view of a mandrel of an extruding apparatus of FIG. 1 illustrating the flow path of gas therethrough.

Referring to FIG. 2, during extrusion of a plastic composition of thermoset polymer particles and a thermoplastic binder for the particles through die 30 to form a softened pipe-preform, air is injected through die 30 under positive pressure into the inside of the softened pipe-preform. A pressure regulator 45 and a pressure gauge 46, both shown in FIG. 1, are utilized to control the amount of air injected from a pressurized supply source 47 depending on the porosity and the type of porous hose desired. A hose with larger micropores for irrigation, for example, requires particle sizes of about 40 to 50 mesh for the thermoset polymer component and a positive gas pressure of about 1 to 3 psi during extrusion of the pipe-preform. Preferably, the gas is air although other inert gases may be used, such as oxygen, nitrogen, carbon monoxide and dioxide, argon and any inert gases not affecting the polymer matrix. Further, the air is injected through the center of the mandrel or die that forms the hole or lumen of the pipe. This permits a uniform pressure on the entire inside of the pipe-preform wall as it exits the extruder and is cooled. By injecting at a very low pressure, a more consistent size and shape of the pipe may be maintained. Keeping a consistent size and shape to a pipe provides consistency in the leak rate and porosity over the pipe length. Gas is preferably injected through the center of the heated die 30 and into the pipe-preform under a positive pressure of about 1/27 to about 3 psi for rubber particle mesh sizes of about 3 to about 120, and at a temperature to hold the pipe-preform in a substantially constant size and shape during the extrusion.

It should be understood that the embodiments of the present invention shown and described in the specification are only preferred embodiments of the inventor who is skilled in the art and are not limiting in any way. Therefore, various changes, modifications or alterations to these embodiments may be made or resorted to without departing from the spirit of the invention and the scope of the following claims.

What is claimed is:

1. A blending process for improving extrusion efficiency and quality of porous plastic pipe comprising:

volumetrically delivering to a mixing hopper for preblending a major amount of thermoset polymer particles and a minor amount of thermoplastic binder particles for said thermoset polymer particles, preblending the thermoset polymer particles and thermoplastic binder particles in said hopper to achieve a consistent blend for uniform porosity in the porous plastic pipe, volumetrically feeding from said hopper said preblended polymer and binder particles at a volumetric feed rate for controlled discharge into an extruder, and extruding said preblended polymer and binder particles at an extrusion rate and temperature to melt the binder particles and bind the polymer particles therewith to produce said porous plastic pipe having uniform porosity along the length of the pipe, controlling the volumetric feed rate and the extrusion rate to achieve improved extrusion efficiency and quality of said porous plastic pipe.

2. The blending process of claim 1 wherein said polymer particles comprise rubber particles.

3. The blending process of claim 2 wherein said thermoplastic binder particles comprise a polyolefin or copolymer thereof.

4. The blending process of claim 2 wherein said thermoplastic binder particles comprise polyethylene.

5. The blending process of claim 1 further comprising, prior to volumetrically delivering said polymer particles and binder particles to said mixing hopper, separately loading each of said polymer and binder particles into a plurality of separate feeding chambers and thereafter feeding them for preblending.

6. The blending process of claim 5 where at least one of said chambers has an agitator for mixing in said chamber.

7. The blending process of claim 5 wherein each of said polymer particles and binder particles is vacuum loaded into said chambers.

8. The blending process of claim 5 wherein said polymer particles comprise rubber particles.

9. The blending process of claim 7 wherein said thermoplastic binder particles comprise polyethylene.

10. The blending process of claim 1 wherein volumetric metering augers with variable speed drives are used for the volumetric delivery of said polymer particles and binder particles.

11. The blending process of claim 1 wherein volumetric metering takeaway augers with variable speed drives are used for controlled discharge of said polymer particles and binder particles to provide a substantially uniform porosity along the length of said pipe.

12. A blending process for improving extrusion efficiency and quality of porous plastic pipe comprising:

loading a major amount of rubber particles having a mesh size of about 60 to about 140 mesh and a minor amount of polyethylene binder particles for said rubber particles into separate feeding chambers, volumetrically delivering by volumetric metering augers with variable speed drives each of said rubber particles and polyethylene binder particles from said chambers to a mixing hopper for preblending prior to extrusion, preblending said rubber particles and polyethylene binder particles in said hopper to achieve a consistent blend for uniform porosity in the porous plastic pipe.

volumetrically feeding by a volumetric metering takeaway auger with a variable speed drive said preblended rubber particles and polyethylene binder particles for controlled discharge into an extruder, extruding said preblended rubber particles and polyethylene binder particles at an extrusion rate and temperature to melt the polyethylene binder particles and bind the rubber particles therewith to produce said porous plastic pipe having a substantially uniform porosity along the length of said porous pipe, controlling the volumetric feed rate and the extrusion rate to achieve improved extrusion efficiency and quality of said porous plastic pipe.

* * * * *